(12) United States Patent
De Guglielmo et al.

(10) Patent No.: US 6,527,102 B2
(45) Date of Patent: Mar. 4, 2003

(54) INSTALLATION FOR FORMING BATCHES OF ARTICLES

(75) Inventors: Pascal De Guglielmo, Montgueux (FR); Alain Cartier, Fontvannes (FR); José Ferry, Luyeres (FR); Thierry Moroy, Saint Germain (FR)

(73) Assignee: Aries Packaging, Rosieres Pres Troyes (FR)

(*) Notice: Subject to any disclaimer, the term of this patent is extended or adjusted under 35 U.S.C. 154(b) by 52 days.

(21) Appl. No.: 09/751,370

(22) Filed: Apr. 23, 2001

(65) Prior Publication Data

US 2002/0043446 A1 Apr. 18, 2002

(30) Foreign Application Priority Data

Dec. 29, 1999 (FR) .............................................. 99 16660
Dec. 29, 1999 (FR) .............................................. 99 16658
Jun. 21, 2000 (FR) .............................................. 00 07945

(51) Int. Cl.⁷ ............................................. B65G 47/26
(52) U.S. Cl. .................................. 198/419.3; 198/459.2
(58) Field of Search .......................... 198/419.3, 459.2, 198/418.7, 459.1

(56) References Cited

U.S. PATENT DOCUMENTS

| | | | | |
|---|---|---|---|---|
| 1,941,152 A | * | 12/1933 | Noll ........................ | 198/459.2 |
| 2,638,202 A | * | 5/1953 | Carter ....................... | 192/16 |
| 2,868,243 A | * | 1/1959 | Henschen et al. | |
| 2,910,167 A | * | 10/1959 | Phin ......................... | 198/456 |
| 3,115,232 A | * | 12/1963 | Carter ....................... | 156/566 |
| 3,330,402 A | * | 7/1967 | Schlueter .................... | 101/35 |
| 3,845,852 A | | 11/1974 | Langen et al. ............ | 198/34 R |
| 4,274,533 A | | 6/1981 | Abe ........................... | 198/450 |
| 5,070,995 A | | 12/1991 | Schaffer et al. ............. | 198/460 |
| 5,603,398 A | * | 2/1997 | Crouch ...................... | 198/419.1 |
| 5,718,030 A | * | 2/1998 | Langmack et al. ............ | 15/63 |
| 5,724,785 A | | 3/1998 | Malanowski ................ | 53/48.1 |
| 5,772,001 A | * | 6/1998 | Otruba et al. ............ | 198/459.2 |
| 5,979,147 A | | 11/1999 | Reuteler ....................... | 53/448 |
| 6,276,514 B1 | * | 8/2001 | Cochin ..................... | 198/459.2 |

FOREIGN PATENT DOCUMENTS

| | | | |
|---|---|---|---|
| BE | 834189 | 2/1976 | |
| DE | 3129723 | 7/1980 | .......... B65G/47/29 |
| EP | 0654408 | 5/1995 | .......... B65B/57/14 |
| GB | 955622 | 7/1961 | |
| GB | 974995 | 11/1964 | |

* cited by examiner

Primary Examiner—Christopher P. Ellis
Assistant Examiner—Richard Ridley
(74) Attorney, Agent, or Firm—Nawrocki, Rooney & Sivertson, P.A.

(57) ABSTRACT

A packaging installation for forming finished products, from batches of articles, including a conveyor, a feed track, an article transferring mechanism, and a conveyor drive mechanism. The conveyer is able to receive batches of articles to route them from an upstream location to a downstream location. The feed track routes articles to the conveyer. The article transferring mechanism that transfers articles from the feed track to the conveyer groups the articles to form spaced apart batches. The transporter routes cardboard blanks or equivalent to the conveyer, and disposes the blanks on the conveyer opposite batches of articles. The conveyer, transfer, and transport drive mechanism, is characterized in that it comprises a control and slaving device, that applies a speed profile to each drive mechanism to allow the adjustment of the pitch and/or number of articles per batch according to the pitch and/or type of batch required.

27 Claims, 10 Drawing Sheets

INSTALLATION FOR FORMING BATCHES OF ARTICLES

The present invention relates to a packaging installation for forming finished products such as packs from batches of articles.

The present invention notably applies to the packaging of articles such as bottles or cans, generally cylindrical in shape.

It is known that the articles are first of all routed individually on a supply track up to a grouping station where batches of articles are formed and then spaced apart in order to be transferred to a discharge track, along which they are wrapped, or packed.

In order to form a space between two successive batches of articles, it is known that the batches of articles can be accelerated between the supply track and the discharge track.

The document GB-974 995 can notably be cited.

The space then formed between the same faces of two consecutive batches is referred to as the "pitch" or "machine pitch".

Because of the preservation of the throughput of the machine, it is easy to establish, between the linear output speed of an article and its input speed, the following relationship:

$$VS = VE \times \frac{P}{L}$$

where VS is the output speed of the article, VE its input speed, P the machine pitch and L the length of a batch of articles.

Distributors are at the present time seeking to reduce their stocks whilst offering every more diversified ranges of packaged products.

As a result the throughput of the packaging machines must be continually upgraded. Thus, in the field of the packaging of bottles or cans, at the present time throughputs of around 15,000 to 100,000 bottles per hour are currently being achieved.

In addition, distributors require to be able to vary their offer within the same product range, offering to consumers, for the same articles such as a bottle or a can filled with a beverage, varied packagings such as packs of two, three, four, six or eight articles or more.

In order to meet these requirements, manufacturers must be in a position to continually renew their machine ranges, so as to adapt them not only to the shapes of new products, to their sizes, to their weights, but also to the size and shape of their packaging, usually cardboard blanks or equivalent.

At the present time, manufacturers are offering distributors packaging solutions or machines which have many drawbacks.

Certain manufacturers are offering distributors one machine for each type of finished product, which is cumbersome and expensive.

Other manufacturers, for their part, are offering one machine for each range of products, which requires setting the machine according to the type of packaging required: batches of two, four, six, eight or more.

This is because, for a constant machine throughput (and therefore a constant input speed), it is necessary to adapt the output speed and/or the machine pitch, through the equation given above.

The majority of machines do not have a pitch adjusting system. It is therefore necessary to increase the output speed, the pitch being fixed whatever the number of articles per batch.

Thus, changing for example from a grouping by batches of twelve articles to a grouping by batches of four makes it necessary to triple the output speed of the machine, which is incompatible with the physical limits of the installations, and in particular the packaging devices.

Some machines have manual pitch adjusting systems, which requires as many manual actions as there are changes of product within the same range.

At the present time, the frequencies of these changes may attain two to three per day, a frequency which is difficult to achieve by means of manual adjustments.

The invention aims at resolving notably the aforementioned drawbacks of the prior art, by proposing an installation which allows the automatic adjustment both of the number of articles per batch, of the machine pitch, and of the production rate.

To this end, the object of the invention is a packaging installation for forming finished products, such as packs, from batches of articles, which comprises:

a conveyer able to receive the successive batches of articles in order to route them from a so-called upstream location to a so-called downstream location, the upstream faces of two successive batches being spaced apart by a predetermined distance known as the pitch;

a feed track along which the articles are routed one by one to the said conveyer whilst being juxtaposed with each other;

means of transferring the articles from the feed track to the conveyer, able to take and group the articles in order to form batches spaced apart;

a transporter able on the one hand to route cardboard blanks or equivalent one by one, placed substantially flat on the transporter, to the said conveyer, and to dispose the blanks on the conveyer opposite batches of articles;

means of driving the conveyer, the transfer means and the transporter.

The installation is characterised in that it comprises a control and slaving device for the drive means, able to apply to each drive means a speed profile chosen from amongst a preprogrammed set of speed profiles, to allow the adjustment of the pitch and/or of the number of articles per batch according to the pitch and/or the type of batch required.

To each type of packaging there corresponds a speed profile for each of the drive means.

By programming these speed profiles in advance, it is therefore possible to change automatically from one to another, so that setting the machine is easy and rapid.

It is thus possible to change immediately from one type of packaging to another, for example from a packaging by batches of eight to a packaging by batches of four, whilst maintaining the output speed constant.

According to one embodiment, this installation also comprises:

means adjacent to the feed track and to the transfer means, able to sequence and time the articles coming from the feed track so that they have the required positioning and separation at the time they are gripped by the transfer means; and a means of driving the means for sequencing and timing the articles, slaved to the control device.

According to one embodiment, the said transfer means comprise a toothed wheel, at least part of which is mounted so as to pivot about a rotation shaft, this wheel being disposed close to the supply track and the discharge track, substantially tangent to these, this wheel comprising the so-called gripping members.

The gripping members are for example in the form of teeth substantially regularly spaced apart, projecting radially from the toothed wheel, each tooth describing a circle passing through a first angular position in which it engages at least one article at the supply station, and a second angular position in which it disengages it at the discharge station.

According to one embodiment, the wheel comprises a circular fixed base and a rotating disc, coaxial in place one above the other, between which are disposed radial arms whose free ends form the said teeth.

According to a particular constructional arrangement, the said arms are mounted for rotation on the disc by means of pivots with axes parallel to the axis of the wheel.

For example, each arm has a roller or toe which cooperates with a groove formed in the base, this groove being extended in a closed loop around the axis of rotation of the wheel.

This groove is arranged so that:

when the tooth passes through the supply station, the arm which carries it pivots in the direction opposite the rotation of the wheel so that the speed of the wheel decreases until it is substantially equal to the input speed when the articles are engaged;

between the supply station and the discharge station, the orientation of the said arm is constant with respect to the wheel so that the speed of the tooth increases until it is substantially equal to the speed of the wheel, so that the articles are grouped together in batches, accelerated and spaced apart.

There can also be provided means disposed close to the supply station, able to sequence and time the articles coming from the supply track, so that they have the required positioning and separation at the time they are gripped by the transfer means.

According to one embodiment, the said transporter comprises pushers for the blanks arranged successively on the transporter, each pusher being able to come into engagement with a blank in order to route it to the conveyer, the distance between two successive pushers in engagement with a blank being predetermined and substantially equal to the pitch.

It is also possible to provide:

means of adjusting the distance between two successive pushers in engagement with a blank in accordance with a predetermined value chosen from amongst a group of preprogrammed values, all multiples of the same value known as the modulus;

a means of driving the adjustment means, slaved to the control device.

According to one embodiment, the control device is arranged to apply to at least one of the drive means, and for example to each drive means, a predetermined speed profile, chosen from amongst a preprogrammed set of speed profiles.

To this end, the or each drive means can comprise a motor whose speed of rotation is continuously adjustable, such as an electric motor, of the brushless DC type.

Other objects and advantages of the invention will emerge during the following description of embodiments, a description given with reference to the accompanying drawings, in which:

FIG. 1 is a perspective view of a packaging installation whose adjustment is automated, this installation comprising notably:

a track for routing the articles one by one;

means for timing and orienting the articles disposed close to one end of this track;

means of transferring the articles from the routing track to a conveyer, which group the articles in batches and dispose them on cardboard blanks or equivalent, coming from a transporter;

means of unstacking the blanks from a stack to this transporter;

means of erecting and closing the blanks around batches in order to form packs.

Figure 4:
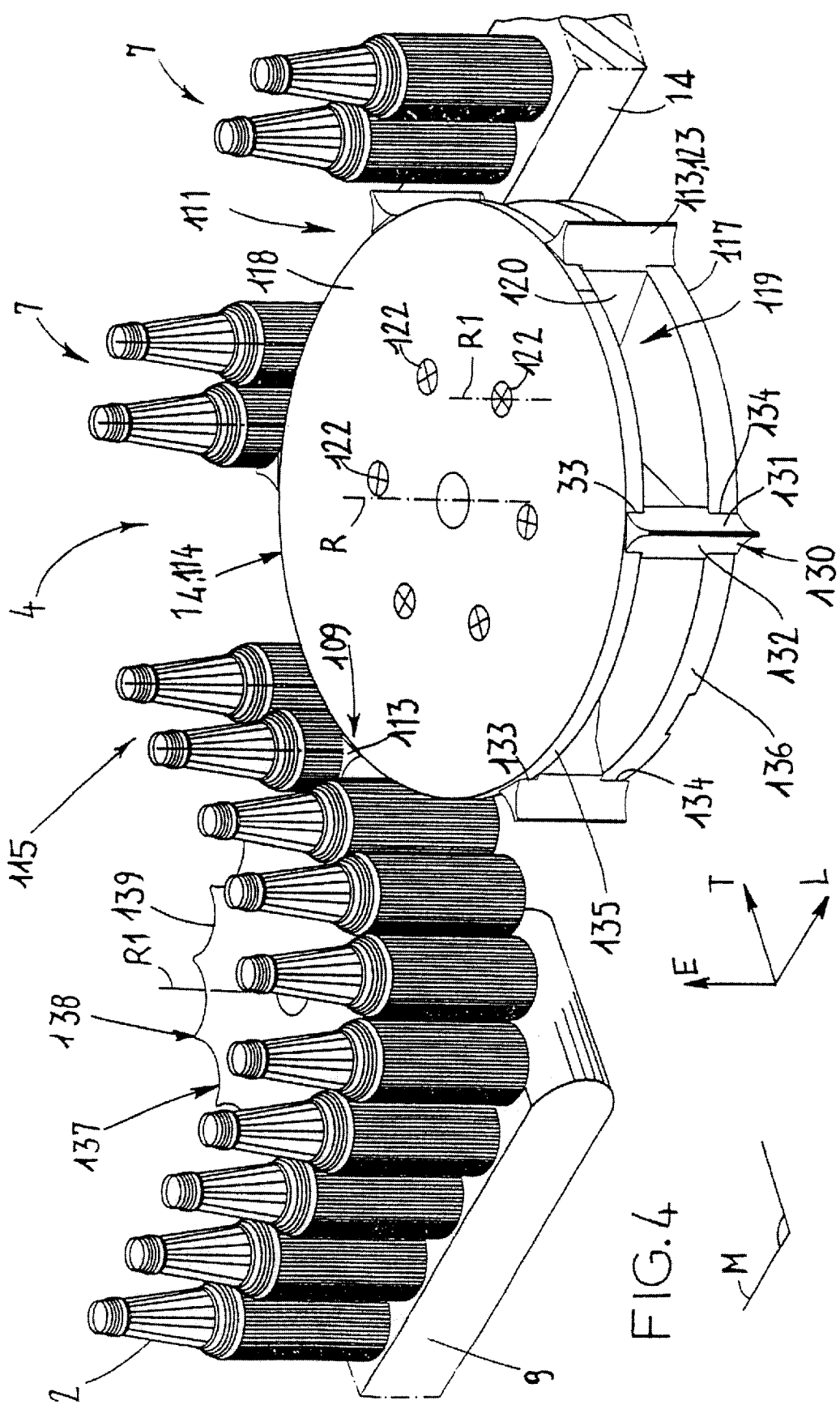
Figure 5:
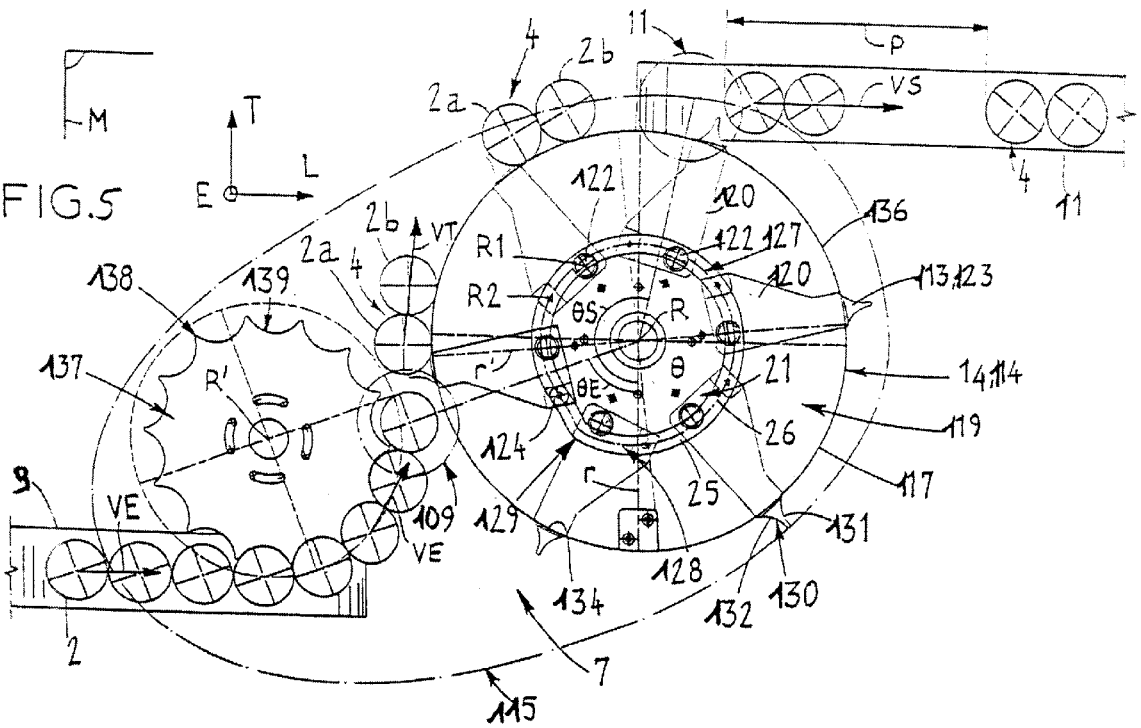
Figure 6:
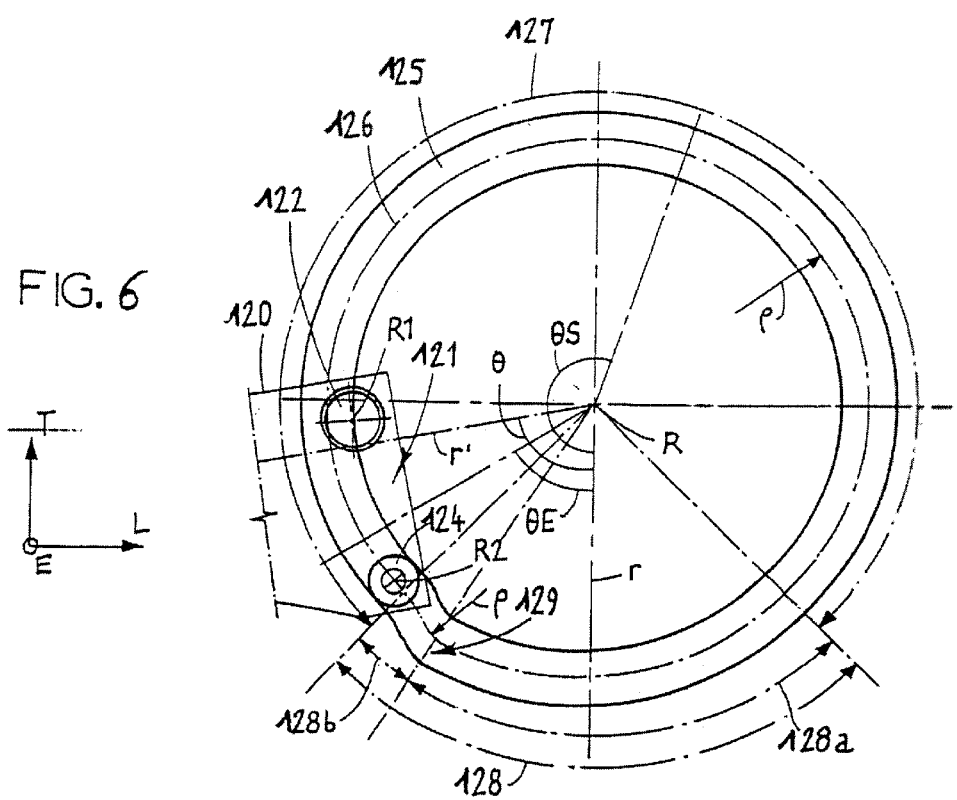
Figure 7:
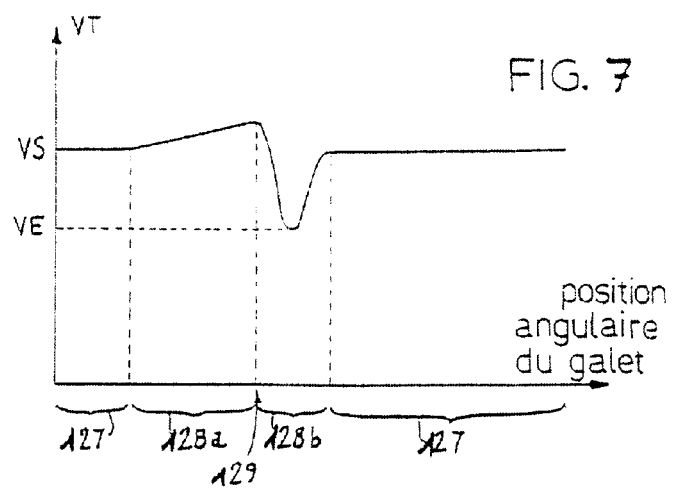
Figure 8:
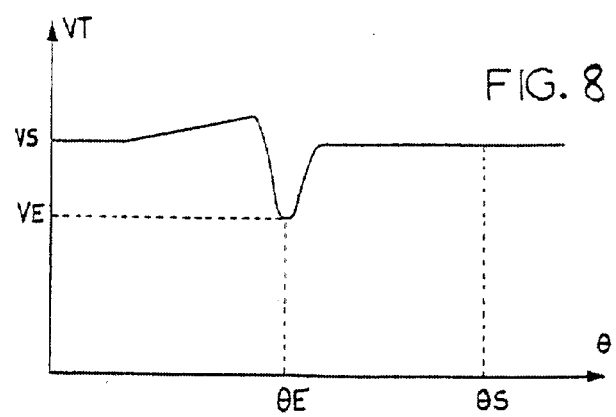
Figure 19:
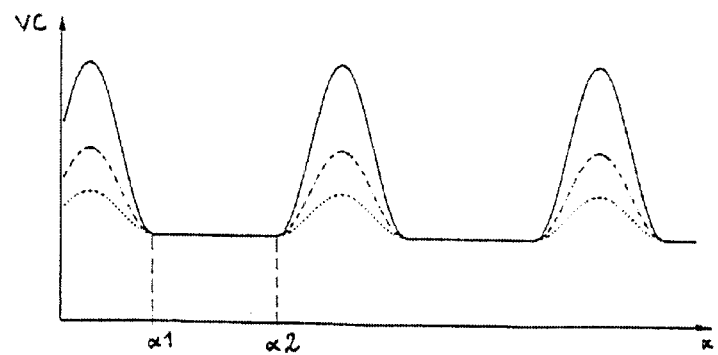
Figure 9:
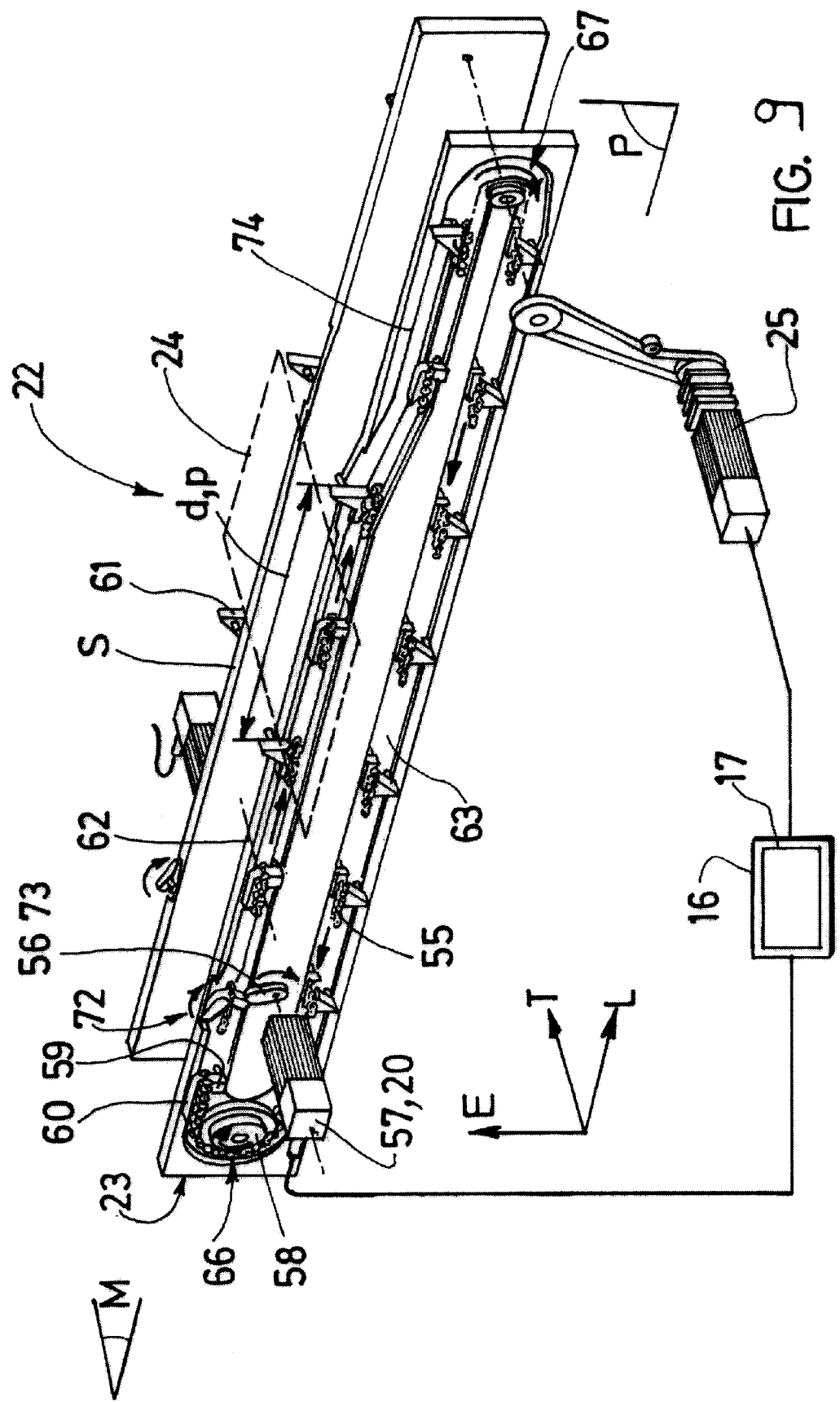
Figure 10:
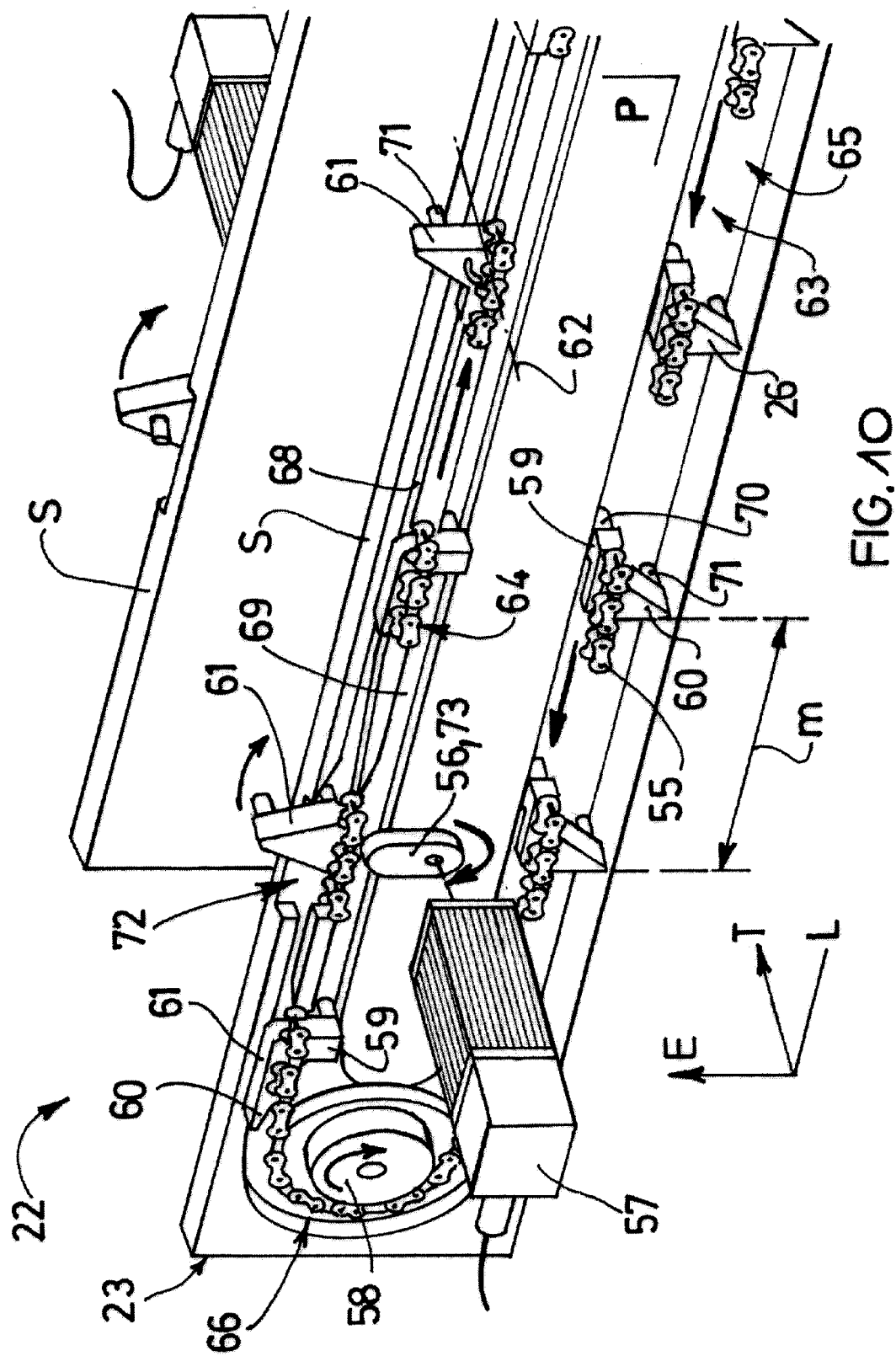

FIG. 4 is a perspective view of an embodiment of the means of transferring the articles from the feed track to the conveyer, and means for sequencing and timing the articles; the transfer means comprise a toothed wheel, at least part of which is mounted so as to pivot, comprising a plurality of gripping members, whilst the means for sequencing and timing the articles comprise a star wheel, also pivoting;

FIG. 5 depicts a plan view in section of the transfer means depicted in FIG. 4;

FIG. 6 is a view of a detail of FIG. 5, which shows the groove formed in the base of the toothed wheel; in this figure an arm is illustrated partially, its internal end, turned towards the shaft of the wheel, having a roller which circulates in the groove; the groove comprises a constant-curvature portion and a variable-curvature portion; the arm is shown in a position in which its roller, which circulates for example in the clockwise direction, has just left the variable-curvature portion and is engaged in the constant-curvature portion; and FIGS. 7 and 8 are graphs illustrating the speed of a gripping member carried by an arm as depicted in FIG. 6, according respectively to the angular position of the roller of the arm, and the angular position of the gripping member; FIG. 7 also depicts schematically, in the form of brackets, the portions of the groove with which the roller cooperates successively when the toothed wheel rotates over one turn;

FIG. 9 is a perspective view of a conveying system comprising two parallel endless transporters for routing flat objects such as cardboard blanks or equivalent; these transporters each comprise a plurality of articulated pushers able to be engaged by an adjustable rotating actuating member;

FIG. 10 is a detail view of FIG. 9, which illustrates the pivoting of a pusher in engagement with the actuating member;

FIGS. 11 to 14 are views in longitudinal elevation of the conveying system of FIGS. 9 and 10, which illustrate four successive steps of the pivoting of a pusher from a so-called inactive position to an active position, according to a first setting of the actuating member, so that the latter actuates one pusher out of two;

FIGS. 15 to 18 are views similar to the views of FIGS. 11 to 14, which illustrate four successive steps of the pivoting of a pusher from a so-called inactive position to an active position, according to a second setting of the actuating member, so that the latter actuates one pusher out of three;

FIG. 19 is a diagram illustrating the change in the speed of rotation of the actuating member of the conveying system of FIGS. 9 to 18, as a function of its angular position, according to a first adjustment where the actuating member comes into engagement with one pusher out of two (solid lines), according to a second setting where it comes into engagement with one pusher out of three (dot and dash lines), and according to a third setting in which it comes into engagement with one pusher out of four (broken lines).

Figure 1:
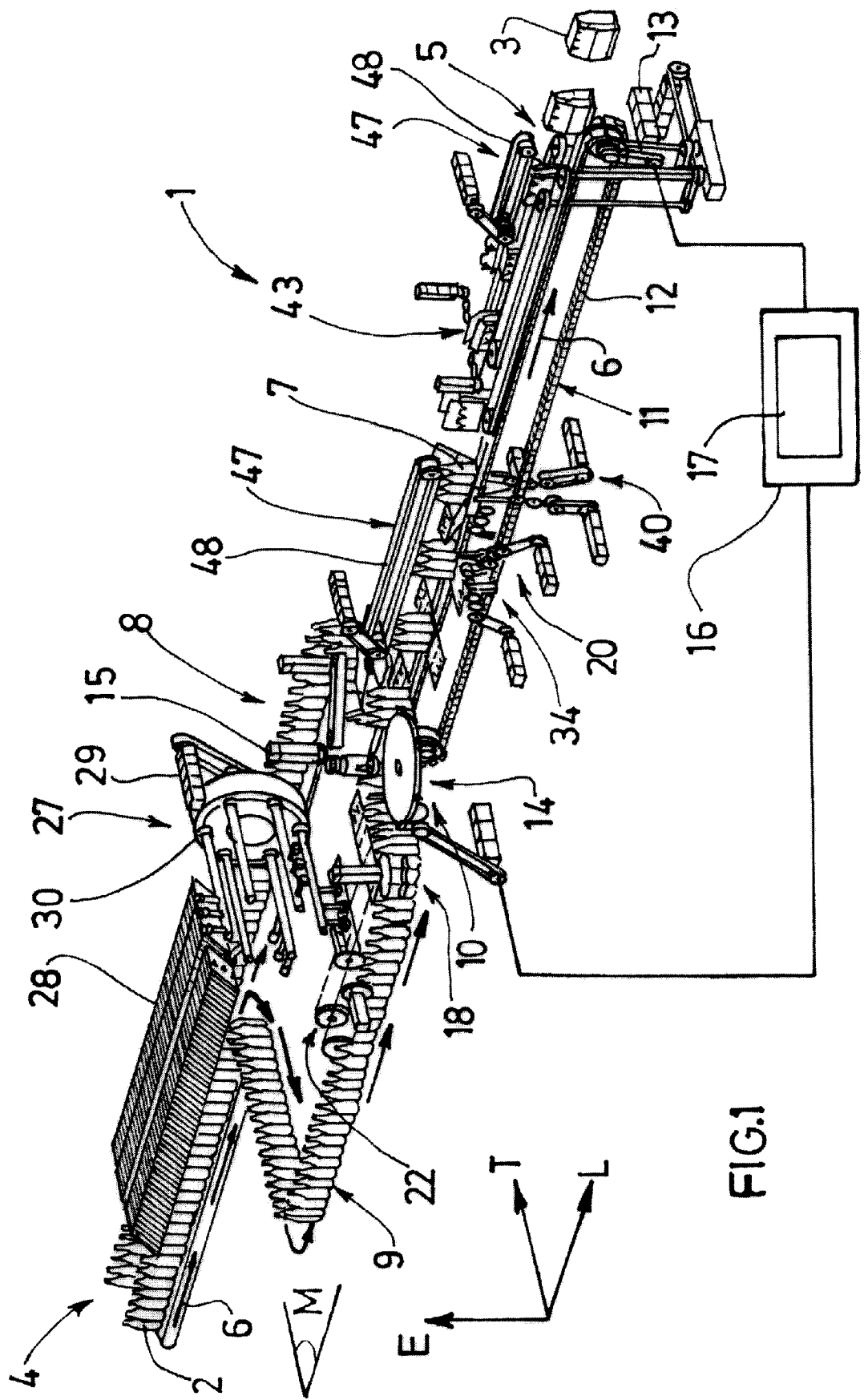

FIG. 1 depicts an installation 1 for packaging articles 2 such as bottles or cans, from which finished products such as packs 3 are formed.

The articles 2 are introduced at an input station 4 of the installation 1, whilst the packs 3 are discharged from an output station 5.

In order to be packaged, the articles 2 undergo a certain number of operations which, for more convenience, are assumed to take place in the same substantially horizontal working plane M, along a conveying path 6 depicted by the arrows, which extends between the input station 4 and the output station 5, substantially in a longitudinal direction L, depicted in FIGS. 1 to 18.

The figures also show a transverse direction T, substantially perpendicular to the longitudinal direction L whilst being contained in the working plane M.

An elevation direction E is also shown. This direction is substantially vertical, perpendicular to the plane M, so that the longitudinal direction L, transverse direction T and elevation direction E form an orthogonal reference frame with respect to which the present description is given.

The terms "upstream" and "downstream" are defined with respect to the longitudinal direction; the term "lateral" is defined with respect to the transverse direction, whilst the terms "top" and "bottom" are defined with respect to the elevation direction.

In this installation 1, the articles 2 undergo two main operations, on the one hand the grouping by spaced-apart batches 7, and on the other hand the packing or packaging of the batches 7 in order to form the packs 3.

Each batch 7 comprises a predetermined number of aligned articles 2. This number can vary between 2 and 6, or more.

Each pack 3 for its part comprises at least one batch 7 of articles 2. For the pack to comprise at least two parallel batches 7 of articles 2, several convergent conveying tracks 6 can be provided, in order to form separate series of successive batches 7, which are then grouped together.

Figure 2:
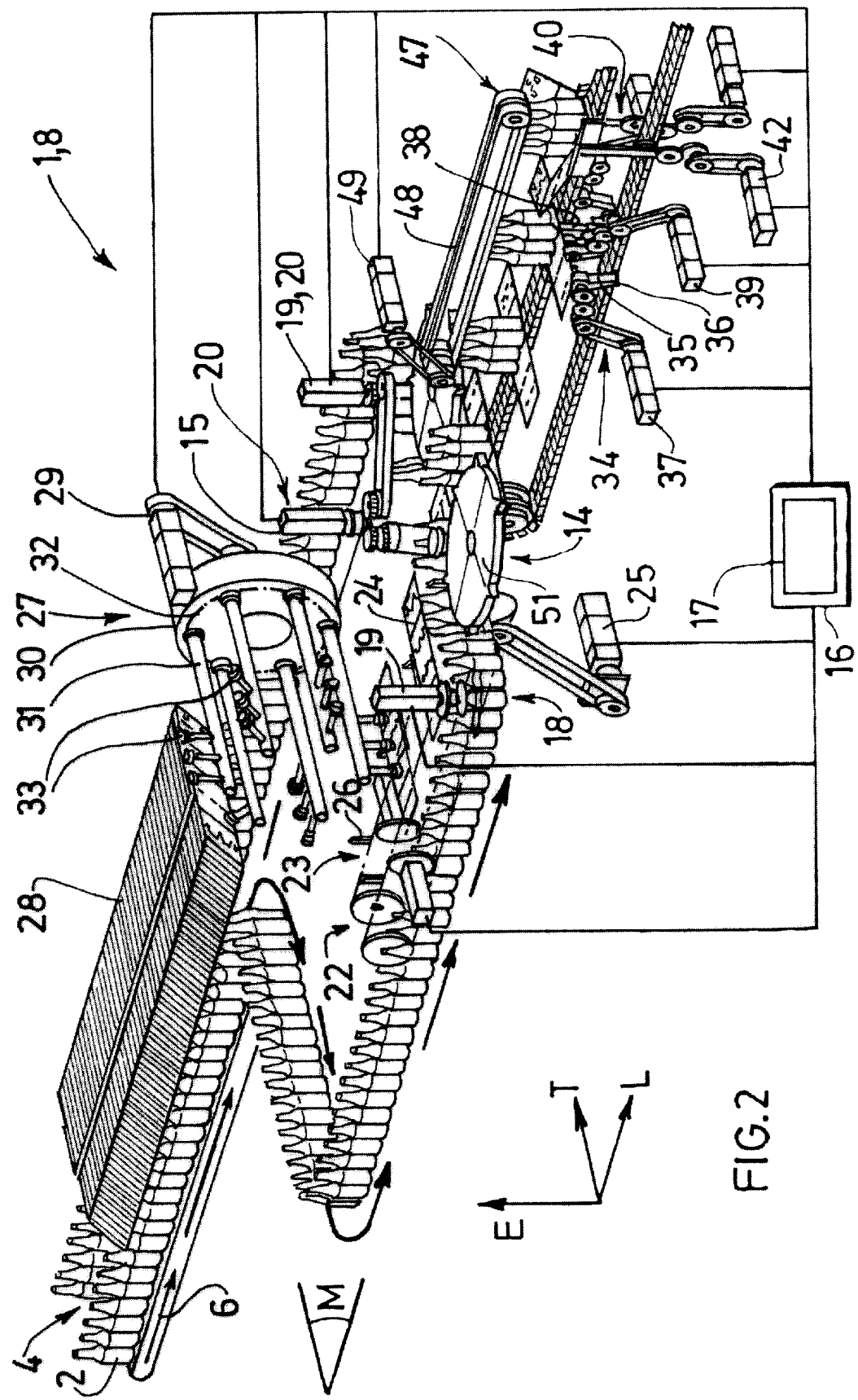
FIG. 2 is a detail view of FIG. 1, illustrating an upstream part of the installation.
Figure 3:
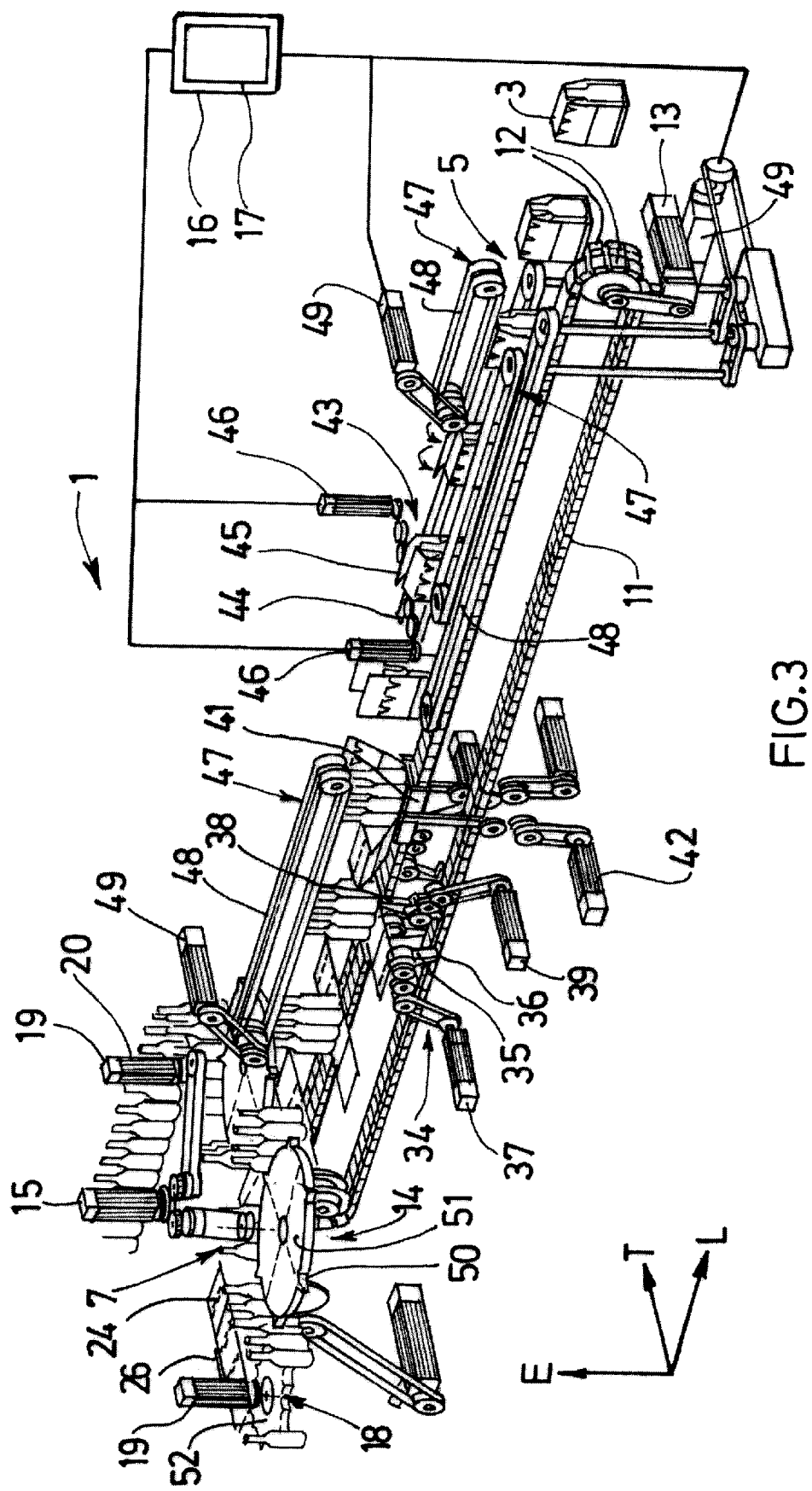
FIG. 3 is a detail view of FIG. 1, illustrating a downstream part of the installation.

The installation depicted in FIGS. 1 to 3 is intended to form packs 3 comprising two identical batches 7 of aligned articles 2.

This is why two conveying tracks 6 are provided, symmetrical with respect to a longitudinal elevation plane, to form two distinct series of batches 7.

This representation is obviously given by way of example, and a plurality of convergent distinct conveying paths 6 can be provided.

For each series of batches 7, the installation 1 comprises a device 8 for making up the batches 7.

This device 8 comprises a feed track 9, which extends between the input station 4 and an intermediate station 10 located between the input station 4 and the output station 5, for example at substantially equal distances from the latter.

The articles 2 are routed along the feed track 9, one by one, whilst being juxtaposed with each other, by means of a motorised conveyer belt or any other equivalent means.

The device 8 also comprises a conveyer 11 able to receive the successive batches 7 of articles 2 in order to route them from an upstream location close to the intermediate station 10 to a downstream location close to the output station 5.

When they are disposed on the conveyer 11, the batches 7 have one face turned upstream and the other turned downstream. The upstream faces of the two successive batches 7 are spaced apart by a predetermined distance P known as the "pitch".

According to an embodiment illustrated in FIGS. 1 to 3, the conveyer 11 comprises two motorised twin endless conveyer belts 12, extending longitudinally.

In addition, the device 8 also comprises:
a means 13 of driving the conveyer 11;
means 14 of transferring the articles 2 from the feed track 9 to the conveyer 11, able to take and group the articles 2 in order to form the spaced-apart batches; and
a means 15 of driving the transfer means 14.

The structure of this device 8 and its method of operation will be described in detail later in the description.

The installation 1 is designed so that the pitch P, the number of articles 2 per batch 7 and the production rate are adjustable automatically.

These adjustments are made by applying notably to the conveyer 11 and to the transfer means 14 particular speed profiles by means of their respective drive means 13, 15.

To this end, the installation 1 also comprises a device 16 for controlling and slaving the drive means 13, 15.

The control device 16 is arranged to apply, to each drive means 13, 15 notably, a speed profile chosen from amongst a preprogrammed set of speed profiles.

The control device 16 has for example a computer memory 17 in which sets of speed profiles are stored, intended to be applied selectively to each of the drive means 13, 15.

The speed of each drive means 13, 15 can be a function of its angular position and/or the time.

So that the articles 2 have, at the time they are gripped by the transfer means 14, the required positioning and separation, the device 8 can also comprise means 18 able to sequence and time the articles 2 coming from the feed track 9.

According to one embodiment, the means 18 are adjacent to the feed track 9 and to the transfer means 14.

The device 8 also comprises a means 19 of driving the means 18 for sequencing and timing the articles 2, slaved to the control device 16, which can apply to the drive means 19 a predetermined speed profile chosen, as before, from amongst a preprogrammed set of speed profiles.

The speeds of the drive means may be variable over time, and drive means 13, 15, 19 are provided, adapted to such variations.

To this end, at least one of the drive means 13, 15, 19, notably the drive means 15 for the transfer means 14, comprises a motor 20 whose speed of rotation is adjustable continuously.

This motor 20 is for example a brushless DC electric motor, more usually referred to as a brushless motor, whose speed of rotation can be modulated as required.

Brushless motors are known and are already the subject of many applications in industry.

Their main advantages are on the one hand a speed of rotation which is variable according to the voltage applied at their terminals, and on the other hand a long life increased by the absence of brushes and commutator, sources of friction and wear.

In order to form the packs 3, the installation 1 also comprises means 21 of packaging the batches 7 of articles 2.

According to one embodiment illustrated in FIGS. 1, 2, 9, 10, the installation 1 comprises a conveying system 22, which includes:
  a transporter 23 lying substantially longitudinally, which routes cardboard blanks 24 or equivalent one by one to the intermediate station 10 in order to dispose them on the conveyer 11 opposite the batches 7 of articles 2;
  a means 25 of driving the said transporter 23, slaved to the control device 16.

The blanks 24 comprise for example a central panel on which the articles 2 are intended to be disposed, and around which are hinged lateral panels and flaps for holding the articles 2.

The blanks 24 are disposed flat on the conveyer 23, whilst lying transversely in the plane M (FIG. 9).

According to an embodiment illustrated in FIGS. 1, 2 and in FIGS. 9 to 18, the transporter 23 comprises pushers 26, each being able to come into engagement with a blank 24 in order to route it to the conveyer 11.

The control device 16 has for example a computer memory 17 in which there are stored sets of speed profiles intended to be applied selectively to the drive means 25 and to each of any other drive means.

According to the functioning provided for each of these drive means, speed profiles which are constant or variable as a function of time are introduced into the control device 16, by programming in the memory 17.

The control device 16 is thus arranged to apply, to the drive means 25 notably, a speed profile chosen from amongst a preprogrammed set of speed profiles, introduced into the memory 17.

The drive means 25 is chosen so that constant speed profiles can be applied to it, the speed profile being modified when there is for example a change of throughput.

To this end, it comprises for example a motor whose speed of rotation is variable and adjustable continuously. This motor is for example a brushless DC electric motor, referred to as a brushless motor.

An unstacking device 27 can be provided, to transfer the blanks 24 from a stack 28 to the transporter 23, and a means 29 of driving the unstacking device 27, slaved to the control device 16.

According to one embodiment illustrated in FIGS. 1 and 2, the unstacking device 27 comprises a rotary drum 30 with a transverse axis, to which pivoting transverse arms 31, substantially parallel and regularly spaced apart, are fixed.

The arms 31 are associated with the drum close to its periphery 32, and comprise suckers 33 able to suck the blanks 24 and transfer them from the stack 28 to the transporter 23, which in its turn transports them to the conveyer 11.

The packs 3 are formed from the batches 7 of articles 2 and the blanks 24 by means notably of a folding device 34, adjacent to the conveyer 11, designed to fold the flaps for holding the blanks.

To this end, the folding device 34 comprises a first rotary arm 35 adjacent to the conveyer 11, rotating at a non-constant speed about a transverse shaft passing substantially through the centre of gravity of the arms 35.

The first arm 35 is symmetrical with respect to its axis and comprises, close to each of its ends, a curved part 36 such that the arm 35 has substantially the shape of an S in a longitudinal elevation plane.

The arm 35 is driven in rotation at a speed such that each half-turn of the arm 35 coincides with the passage of a blank 24.

One of the curved parts 36 then comes into engagement with a flap 24a of the blank 24 turned upstream, in order to fold it in the direction of the articles 2 in the batch 7 as the latter advances on the conveyer 11.

According to one embodiment, the speed of rotation of the arm 35 is non-constant and varies according to its angular position about its shaft.

Notably, the speed of the arm is substantially constant when the curved part 36 is in engagement with the blank 24, whilst it is increasing and then decreasing, or vice-versa according to the adjustment of the pitch P, between two successive passages of a blank 24.

The first arm 35 is driven in rotation by a first drive means 37, slaved to the control device 16.

Moreover, the folding device 34 can also comprise a second rotating arm 38 adjacent to the conveyer 11, similar to the first arm, and disposed downstream thereof, symmetrically with respect to a transverse elevation plane, so that the second arm 38 has substantially the shape of a Z in a longitudinal elevation plane.

The functioning of the second arm 38 is substantially identical to that of the first, its speed of rotation being however substantially different, so that it provides the folding of a flap turned downstream.

The second arm 38 is also driven in rotation, by a second drive means 39, also slaved to the control device 16.

According to one embodiment, a device 40 for erecting the blanks 24 around batches 7 of articles 2 is also provided.

This device 40, adjacent to the conveyer 11 downstream of the folding device 34 described above, is intended to fold the side panels of the blanks 24.

The erecting device 40 comprises a lever 41 in a reciprocating movement in a longitudinal elevation plane from bottom to top and vice-versa (FIG. 3).

This lever 41 in movement pushes the side panels of the blanks 24 upwards as the batch 7 of articles 2 advances on the conveyer 11, in order to fold them towards the articles 2 and partly ensure the closure of the pack 3.

This lever 41 is driven at a predetermined speed in its reciprocating movement by a drive means 42 slaved to the control device 16.

A device 43 for closing the blanks 24 around the batches 7 in order to form the packs 3 is also provided.

This device 43 is for example disposed above the conveyer 11, and comprises a lever 44 driven in a transverse reciprocating movement, in order to come into engagement with a closure panel 45 on the blank 24 and to fold it against the articles 2 in the batch 7.

This lever 44 is moved at a predetermined speed by a drive means 46 of the closure device 43, slaved to the control device 16.

The operating speeds of the drive means 42, 46 are predetermined, whilst being preprogrammed in the memory 17 of the control device 16.

In addition, the installation 1 can comprise a device 47 for guiding the batches 7 along at least part of the conveyer 11, this device comprising for example at least one endless belt 48 circulating along the conveyer 11.

The endless belt or belts 48 are driven in movement at a predetermined speed by a drive means 49 of the guidance device 47, slaved to the control device 16.

In order to ensure continuous synchronised functioning of the installation 1, it is necessary to synchronise its different drive means.

To each drive means slaved to the control device 16 there corresponds a predetermined set of speed profiles introduced into the memory 17.

According to the functioning provided for each of these drive means, speed profiles which are constant or variable as a function of time are introduced into the control device 16 by programming in the memory 17.

Examples of speed profiles are given hereinafter, notably for the means 15 driving the transfer means 14.

The drive means 25, 29, 37, 42, 46, 49 are chosen so that variable speed profiles can be applied to them.

To this end, at least one of them, and for example each of them, comprises a motor 20 such as the one mentioned above, for example a brushless motor.

The device 8 is now described in more detail with reference to FIGS. 8 to 18.

This device 8 comprises a supply track, or feed track 9, along which the articles 2 are routed one by one up to a supply station 109, situated in a grouping zone 115, and for example merged with one end of the supply track 9.

The articles 2 are routed at an input speed VE which is substantially constant along the supply track 9, whilst being juxtaposed with each other, by means of a motorised conveyer belt or any other equivalent means.

The device 8 also comprises a discharge track or conveyer 11, able to receive, at a discharge station 111 situated in the grouping zone 115, the articles 2 grouped by batches 7 in order to route them from upstream to downstream at a substantially constant so-called called output speed VS, greater than the input speed VE.

The device 8 also comprises means 14 of transferring the articles 2 from the supply station 109 to the discharge station 111, which take the articles 2 at the supply station 109 and group them whilst forming the spaced-apart batches 7.

The transfer means 14 are arranged so that the number of articles 2 per batch 7 is variable without stopping the movement of the said articles.

To this end, according to one embodiment, the transfer means 14 comprise a rotating member able to take and group the articles 2 in order to form spaced-apart batches 7, the said rotary member comprising a succession of gripping members 113 which engage the articles 2 at the supply station 109 and disengage them at the discharge station 111 after they have been grouped by batches 7 and spaced apart.

The rotating member makes it possible to vary the number of articles 2 per batch.

Between the supply station 109 and the discharge station 111, the articles 2 are driven continuously along a closed path on a route which follows at least a quarter of the periphery of the rotating member, so that the gripping members 113 can come into contact with the articles and group them into successive batches 7.

The speed of the rotating member is greater than the input speed VE of the articles.

The gripping members 113 are driven and circulate along a closed-loop path at a so-called transfer speed VT.

This transfer speed VT is greater than or equal to the input speed VE, so that the articles are accelerated between the supply station 109 and the discharge station 111.

The input speed VE and output speed VS being predefined, the transfer means 14 are arranged so that the transfer speed VT of the gripping members 113 varies along their path, so that:

when the articles 2 are engaged at the supply station 109, the transfer speed VT is substantially equal to the input speed VE;

when the articles 2 are transferred, that is to say between the supply station 109 and the discharge station 111, the speed of transfer VT is greater than the input speed VE; and when the articles 2 are disengaged at the discharge station 111, the transfer speed VT is substantially equal to the output speed VS.

Thus the engagement and disengagement of the articles 2 is effected without impact and without jolts.

According to one embodiment, illustrated in FIGS. 4 and 5, the transfer means 14 comprise a toothed wheel 114 mounted at least partly pivoting about a substantially vertical rotation axis R, perpendicular to the plane M, and driven in rotation by a drive means 15, such as a motor 20.

This toothed wheel 114 is disposed in a transfer zone 105, close to the supply track 9 and the discharge track 11, for example adjacent to them.

According to one embodiment, the gripping members 113 are in the form of regularly spaced teeth 113, for example six in number, projecting radially from the toothed wheel 114.

When the wheel 114 rotates about its axis R, each tooth 113 describes a circle, passing through a first angular position θE in which it engages, at the supply station 109, at least one article 2 coming from the supply track 9, and a second angular position θS in which it disengages the article 2 at the discharge station on the discharge track 11.

For each tooth 113, its angular position with respect to the rotation axis R of the toothed wheel 114 is denoted θ, this angular position θ being defined arbitrarily as the angular distance separating a fixed transverse radius r of the toothed wheel 114, and a moving radius r' passing through the tooth 113.

The angular distance between the first and second angular positions θE, θS is for example between 90° and 180° approximately.

According to one embodiment, this angular distance is approximately 120° (FIGS. 5 and 6).

The transfer speed VT is the tangential speed of the teeth 113 during the rotation of the wheel 114.

The variations in the transfer speed VT of the tooth 113 according to its angular position θ can be defined as follows.

When θ is substantially equal to θE, the transfer speed VT is substantially equal to the input speed VE of the articles.

In this way, the tooth 113 engages at least two articles 2 continuously, without striking them (FIGS. 4 and 5), forming a batch 7 of grouped articles.

The transfer speed VT then increases continuously with the angular position θ, in order to reach a value substantially equal to the output speed VS.

Thus a space is created between the batch 7 and the articles 2 still on the supply track 9.

The batch 7 then reaches the discharge station 111, where it is disposed on the discharge track 11, which takes it over at a constant speed VS, whilst the tooth 113 disengages therefrom.

According to one embodiment, described now with reference to FIGS. 4 and 5, the toothed wheel 114 comprises a circular fixed base 117 and a rotating disc 118 referred to as a plate in the remainder of the description.

The base 117 and the plate 118 are substantially coaxial, of axis R and placed one above the other, the plate 118 being disposed above the base 117; they define between them a substantially cylindrical enclosure 119.

A location close to the axis R is said to be internal, in contradistinction to a location at a distance from the axis R, said to be external.

Radial branches 120 disposed in a star are inserted in the enclosure 119 between the base 117 and the plate 118.

Each branch 120 has on the one hand an end 121 turned towards the inside, fixed to the plate 118 by means of a pivot 122 of axis R1 parallel to the axis R, all the pivots 122 fitting within a circle of axis R.

Each branch 120 also has a free end 123 turned towards the outside, projecting radially from the enclosure 119 in order to form the tooth 113 described above.

The rotation of the plate 118 about its axis R causes the rotation of the branches 120 in a circular movement of axis R, each branch 120 sweeping in its movement the space defined by the enclosure 119.

The pivoting of each branch 120 about its axis R1 with respect to the plate 118 is controlled by a roller 124 or a toe of axis R2 parallel to the axis R, fixed to the internal end of the branch 120, at a distance from the pivot 122.

Each roller 124 cooperates with a groove 125 forming a cam, provided in the base 117, in which the roller 124 travels when the plate 118 rotates, this groove 125 being extended in a closed loop around the rotation axis R of the toothed wheel 114.

This groove 125 forms in the base a continuous cam track 126, followed by the roller 124, which thus forms a cam follower.

This groove 125 is arranged so that:

when the tooth 113 passes through the supply station 109, the branch 120 which carries it pivots in the opposite direction to the rotation of the wheel 114 so that the speed of the tooth 113 decreases until it is substantially equal to the input speed VE when the articles are engaged; and according to a first embodiment, between the supply station 109 and the discharge station 111, the said branch 120 pivots in the direction of the rotation of the wheel 114 so that the speed of the tooth 113 increases until it is substantially equal to the output speed VS, so that the articles are grouped in batches, accelerated and spaced apart;

according to a second embodiment, between the supply station 109 and the discharge station 111, the orientation of the said branch 120 being constant with respect to the wheel 114, so that the speed of the tooth 113 increases until it is substantially equal to the speed of the toothed wheel 114, so that the articles are grouped together in batches, accelerated and spaced apart.

The second embodiment is now described in detail.

The cam track 126 has a pseudo-circular shape of axis R, and comprises two connected portions:

a first portion 127 of substantially constant curvature, that is to say substantially circular of axis R, extending over approximately a half-turn to three-quarters of a turn around the axis R, turned towards the discharge station 111;

a second portion 128 having a variable curvature, extending over approximately a quarter of a turn to a half-turn around the axis R, and turned towards the supply station 109.

The cam track 126 having a radius of curvature ρ (FIG. 6), it should be stated that the curvature of the cam track 126 is defined by the inverse 1/ρ of the radius of curvature ρ.

In this way:

when the roller 124 passes in the constant-curvature portion 127, the orientation of the branch 120 is substantially constant, the speed VT of the tooth 113 being because of this substantially constant;

when the roller 124 passes in the variable-curvature portion 128, the branch 120 pivots about its axis R1, the speed VT of the tooth 113 varying accordingly.

According to an embodiment illustrated in FIG. 6, the portion 128 comprises:

a first part 128a adjacent to the constant-curvature portion 127, and extending angularly over approximately a quarter of a turn; and a second part 128b situated close to the input station 109, between the first part 128a and the constant-curvature portion 127, and which extends angularly over a few degrees, for example approximately ten.

The first part 128a has a curvature increasing substantially linearly from the constant-curvature portion 127 as far as the second part 128b, so as to form an arc of a spiral of axis R.

The second part, for its part, has a curvature which decreases from the first part 128a as far as the constant-curvature portion 127.

In addition, the variable-curvature portion 128 comprises a baffle 129 situated close to the supply station 109, at the junction between the first part 128a and the second part 128b.

When the roller 124 leaves the portion 127 and engages in the first part 128a, this forces it to move away from the axis R, so that the branch 120 pivots in the direction of rotation of the plate 118, the transfer speed VT of the tooth 113 then increasing (FIGS. 5 and 6).

The tooth 113 then gets ahead with respect to the plate 118.

When the roller 124 passes the baffle 129 and then engages in the second part 128b, the latter forces it to move closer to the axis R, so that the branch 120 pivots in the opposite direction to the rotation of the plate 118, the transfer speed VT of the tooth 113 then decreasing.

The speed VT of the tooth decreases until it is substantially equal to the input speed VE when the tooth 113 passes through the supply station 9, in order to ensure the gripping of the articles 2 without any jolt, the roller then being substantially in the middle of the second part 128b (FIGS. 5 and 6).

The tooth 113 therefore loses its advance, and falls behind with respect to the plate 118.

Regaining the circular portion 127, the roller 124 forces the branch 120 to keep a constant orientation with respect to the toothed wheel, so that the speed VT of the tooth 113 increases substantially up to the speed of the toothed wheel 114, substantially equal to the output speed VS, the articles 2 being grouped in batches 7, accelerated and spaced apart.

According to the first embodiment, regaining the circular portion 127, the roller 124 forces the branch 120 to pivot about its axis R1 in the direction of the rotation of the plate 118, so as to progressively accelerate the tooth 113 so that its speed VT increases substantially up to the output speed VS, the articles 2 being grouped in batches 7, accelerated and spaced apart.

In the two embodiments, the tooth 113 therefore recovers its retardation with respect to the plate 118.

By forming a cam follower, the roller 124 therefore makes it possible to regulate the transfer speed VT of the tooth 113 during the rotation of the plate 118.

The adjustment of the toothed wheel 114 to allow notably the change in the number of articles 2 per batch 7 is effected by angularly shifting the base 117 so as to angularly offset the cam track 126:

in the direction of the rotation of the plate 118 in order to decrease the number of articles 2 per batch 7; or in the opposite direction to the rotation of the plate 118 in order to increase the number of articles 2 per batch 7; and by causing the ratio between the speeds of a star wheel 137 (defined below) and of the wheel 114 to vary.

Thus, for example, in order to group together n successive articles, the relative speeds are such that a tooth 113 engages 1 article 2 every n articles 2 advanced by the star wheel 137.

It is thus possible to change the number of articles per batch easily and rapidly.

Moreover, in order to facilitate the gripping of the articles 2, the teeth 113 are extended in an elevation direction, and have a surface 130 able to match the shape of the articles 2.

According to one embodiment, the teeth 113 have two opposite external surfaces 131, 132 curved so as to match the shape of a cylindrical article 2, and two guide surfaces, top 133 and bottom 134, projecting vertically on each side of each branch 120.

The guide surfaces 133, 134 extend tangentially with respect to the wheel 114, and are in abutment respectively on a circumference 135 of the plate 118 and on a circumference 136 of the base 117, on which they slide when the plate 118 rotates with respect to the base 117.

In order to sequence and time the articles 2 coming from the supply track 9 so that they have the required positioning and separation when engaged by the teeth 113, the device 8 can also comprise means 18 such as a star wheel 137.

The star wheel 137 is mounted so as to pivot about a rotation axis R' substantially parallel to the rotation axis R of the toothed wheel 114.

According to one embodiment, illustrated in FIGS. 4 and 5, the star wheel 137 comprises at its periphery teeth 138 which mesh with the articles 2 coming from the supply track 9, and disengage from them at the supply station 109 in order to enable them to be gripped by the teeth 113 on the toothed wheel 114.

To this end, the teeth 138 have housings 139 able to individually receive the articles 2, the shape of each housing 139 being substantially complementary to an article 2.

In order to ensure a continuous movement of the articles 2, the tangential speed of the star wheel 137, or of the housings 139, is substantially equal to the input speed VE.

The rotation of the star wheel 137 can be provided by a drive means 19 such as a motor 20.

According to one embodiment, one of the motors 20 of the drive means 15, 19, or both, are connected to the control and slaving device 16, which is arranged to apply a predetermined speed profile to them.

According to one embodiment, the motor 20 is a motor whose rotation speed is adjustable continuously, for example an electric motor, of the brushless DC type.

A description is now given of the travel of a set of two consecutive articles 2, one 2a being said to be upstream, the other 2b downstream, intended for the same batch 7, from the station, according to a setting in which the installation 1 produces packs of four articles (that is to say two batches of two articles).

The two articles 2a, 2b are routed along the supply track 9 at a constant speed VE up to the transfer zone 105, where they are engaged by the star wheel 137, which causes them to describe a trajectory in the form of an arc of a circle, still at a constant speed VE, as far as the supply station 109.

They are then simultaneously disengaged by the star wheel 137 and engaged by the toothed wheel 114, a tooth 113 coming into engagement with the upstream article 2a at a speed equal to the input speed VE.

The articles 2a, 2b then undergo a progressive acceleration under the effect of the increase in the speed VT of the tooth 113.

The effect of this acceleration is to group them in a batch 7, whilst spacing them apart from the following articles 2, not yet engaged by the toothed wheel 114.

The articles 2a, 2b then describe a path substantially in the form of an arc of a circle along the periphery of the wheel 114, for example a quarter of a circle, at the end of which they are disposed on the discharge track, at a speed equal to the output speed VS.

When changing the "machine pitch" P, which corresponds to the distance separating two consecutive articles, the toothed wheel 114 is changed and replaced by:
 a wheel 114 comprising a smaller number of branches 120 for an increase in the pitch P; or
 a wheel 114 comprising a greater number of branches 120 for a reduction in the pitch P.

In conventional installations, where the gripping members circulate at a constant speed equal to the output speed, it is difficult to increase the rate without risking damaging the articles, because of the impacts which they undergo during the abrupt accelerations caused by the gripping members.

The installation 1, and more particularly the device 8, allow on the one hand the adjustment of the production rate C, and on the other hand the adjustment of the number of articles 2 per batch 7 and the pitch P.

It should be stated that the production rate C of the installation 1 is defined as follows:

$$C = \frac{VS}{P} \qquad (2)$$

Thus, in order to act on the rate C at a constant pitch P, it is possible to adjust the output speed VS.

The adjustment of the output speed VS can be effected by regulating notably the speed of operation of the drive means 13 of the conveyer 11.

The adjustment of the pitch P is related to the adjustment of the number of articles per batch 7. More precisely, the pitch P is an increasing function of the number N of articles per batch 7.

The conveying system 22 is now described, according to a particular embodiment with reference to FIGS. 9 to 18.

This conveying system 22 makes it possible to convey the blanks 24 flat, along a transportation surface S lying in the plane M, to the conveyer 11, whilst disposing them opposite batches 7 of articles, for example under the batches 7.

It is adjustable, so as to be able to transport blanks 24 of different sizes, according to the number of articles 2 per batch 7 and the pitch P.

To this end, the transporter 23 comprises a plurality of pushers 26 regularly spaced apart, fixed to a movable support 55, which defines a closed-loop path, locally contiguous with the transportation surface S.

The pushers circulate continuously, in a single direction and periodically along this path, which lies substantially in a longitudinal elevation plane P, referred to as the conveying plane.

The support 55 is moved by the drive means 25, which is slaved to the control device 16, and whose speed can vary continuously.

To this end, the drive means 25 can comprise a motor 20 with an adjustable and/or variable rotation speed, for example a brushless motor.

Each pusher 26 is mounted so as to be able to move between a so-called inactive position in which the pusher 26 is located at a distance from the transportation surface S and does not project from it, and a so-called active position in which it projects at least partially from the transportation surface S.

In its active position, the pusher 26 comes into engagement with a blank 24 and pushes it along the transportation surface S.

Each pusher 26 can be actuated by a rotating movable member called a selector 56, coming into engagement with the pusher 26 in order to cause it to pass from its inactive position to its active position.

This selector 56 is moved by a drive means 57 whose speed is variable, and which for this purpose comprises a brushless motor, or any other type of motor whose speed of rotation is adjustable and/or variable continuously.

The drive means 57 is slaved to the control device 16, whose memory 17 contains a preprogrammed set of non-constant speed profiles, applicable to the drive means 57.

The control device 16 is arranged to apply to the drive means 25 of the actuating member 56 a speed profile such that the functioning of the actuating member 56 is periodic, the period of the actuating member 56 being defined as the interval of time separating two successive passages of the actuating member 56 through the same position.

Notably, the period of the transporter 23 being defined as the interval of time separating the passage of two pushers 26 through the same point on the path, the control device 16 is arranged so that the period of the actuating member 56 is a multiple of the period of the transporter 23.

According to one embodiment illustrated in FIGS. 9 and 10, the support 55 is an endless chain meshing with two pinions 58, at least one of which is associated with the motor 20.

In variants which are not shown, the support 55 is a notched belt, or a tractor cable, or any other equivalent means.

Whilst each pusher 26 is a rigid piece in the form of a V which comprises a first branch 59 able to come into engagement with the selector, and a second branch 60 substantially perpendicular to the first.

When the pusher is in the inactive position, this second branch 60 projects at least partly from the transportation surface S in order to come into engagement with a blank 24.

To this end, the second branch 60 comprises a surface 61 which, when the pusher 26 is in its active position, lies in a transverse elevation plane.

The pushers 26 are regularly spaced along a chain 55, on which each is mounted so as to pivot about a transverse shaft 62, forming a means of fixing the pusher 26 to the chain 55.

The pushers circulate along their path whilst being guided in a rail 63 which lies substantially in a longitudinal elevation plane, below the transportation surface S, parallel to this path.

The rail has a longitudinal substantially rectilinear top zone 64, contiguous with the transportation surface S, and a bottom zone 65, also substantially rectilinear, and longitudinal, located at a distance from the transportation surface S, connected by first and second end zones 66, 67, in the form of semicircles.

Along the top zone 64, the rail 63 separates into two tracks: a top track 68, contiguous with the transportation surface S, and a bottom track 69 located below the first track 68.

The pusher 26, for its part, comprises a first toe 70, projecting laterally from the first branch 59, and a second toe 71, projecting laterally from the second branch 60.

The toes 70, 71 allow both the guidance and the locking of the pusher 26 in the rail 63.

Close to the first end zone 66, the transporter 23 has a switching zone 72 where the tracks 68, 69 are interrupted, to enable the pushers 26 to pivot freely about their axis whilst passing from their inactive position to their active position.

The selector 56 is disposed close to this switching zone 72.

In order to ensure the pivoting of the pushers, the selector 56 comprises a cam 73 lying substantially in the plane P, and driven in rotation in this plane P about a transverse shaft.

The angular position of the cam 73 in the plane P is denoted α.

The cam 73 is adjacent to the top zone 64 of the rail, in order to come momentarily into engagement with the second branch 60 of the pusher 26 so as to cause the latter to pivot.

During its rotation, the cam 73 passes from a first angular position α1, in which it engages at least the pusher 26, in order to cause it to pivot about its axis 62, and a second angular position α2 in which it releases the pusher 26.

The conveying system 22 is designed so that the cam 73 acts on a predetermined subset of the set of pushers 26 of the transporter 23.

To this end, the functioning of the cam 73 is periodic, its period being defined as the interval of time separating two successive passages of the cam 73 through the same angular position.

If the period of the transporter 23 is defined as the interval of time separating the passage of two pushers through the same point on the path defined by the chain 55, the period of the cam 73 is a multiple of the period of the transporter 73.

The period of the cam 73 is adjustable by applying to its drive means 57 a speed profile chosen from amongst a set preprogrammed in the memory 17 of the control device 16.

Thus the cam 73 is designed to actuate one pusher 26 out two, one out of three, one out of four, or more. Its rotation speed VC is therefore regulated accordingly.

It is therefore possible to vary the number of pushers simultaneously in the active position.

The speed VC at which the cam 73 is driven by its drive means 57 is continuous, periodic, and variable according to the angular position α of the cam 73.

Notably the speed VC has notably the following characteristics:

it is of constant sign, so that the cam 73 turns in a single direction in the same direction as the chain 55;

it is substantially constant from the first angular position α1 as far as the second angular position α2 of the cam 73;

it is non-constant, for example increasing and then decreasing, or vice-versa according to the setting, from the second angular position α2 as far as the first angular position α1 of the cam 73.

The speed profile of the cam 73 is for example chosen from amongst a set of speed profiles preprogrammed in the memory 17 of the control device 16.

In this way, according to its speed, the cam 73 can selectively engage a certain number of successive pushers 26 belonging to a predetermined subset of the set of pushers 26.

Three speed profiles VC of the cam 73, according to its angular position, are depicted in FIG. 19.

The profile depicted in solid lines corresponds to a setting of the cam 73 according to which the latter actuates one pusher 26 out of two.

Whilst the profiles depicted in dot and dash and broken lines correspond respectively to two settings according to which the cam 73 actuates one pusher out of three and one pusher out of four.

The distance d separating the surfaces 61 of two successive pushers in the active position is substantially equal to the pitch P of the installation.

This is because this distance corresponds to the distance between two successive blanks 24, intended to be disposed opposite batches 7 of articles 2, for example below these, prior to the making up of the packs 3.

The distance d is therefore a multiple of the distance m separating two successive pushers 26 on the chain 55.

This distance m, referred to as the modulus, is fixed at the time of manufacture of the installation, and notably of the conveying system 22.

An operating mode of the conveying device 22 is now described, according to a first setting in which the cam 73 engages one pusher 26 out of two, with reference to FIGS. 10 to 14.

For this purpose the travel of first, second and third successive pushers 26a, 26b, 26c along their path is followed, starting from a location in which the pushers 26a, 26b, 26c are all three in the bottom zone 65 of the rail 63.

The three pushers 26a, 26b, 26c are routed along the bottom zone 65, and then along the first end zone 66, whilst being kept fixed with respect to rotation in the rail 63, the toes 70, 71 being in abutment against the edges of the rail.

On leaving the first end zone 66, the first toe 70 of the pushers 26a, 26b, 26c is guided by the bottom track, whilst the second toe 71 is guided by the top track 68.

The pushers 26a, 26b, 26c are then all three in their inactive position.

Figure 11:
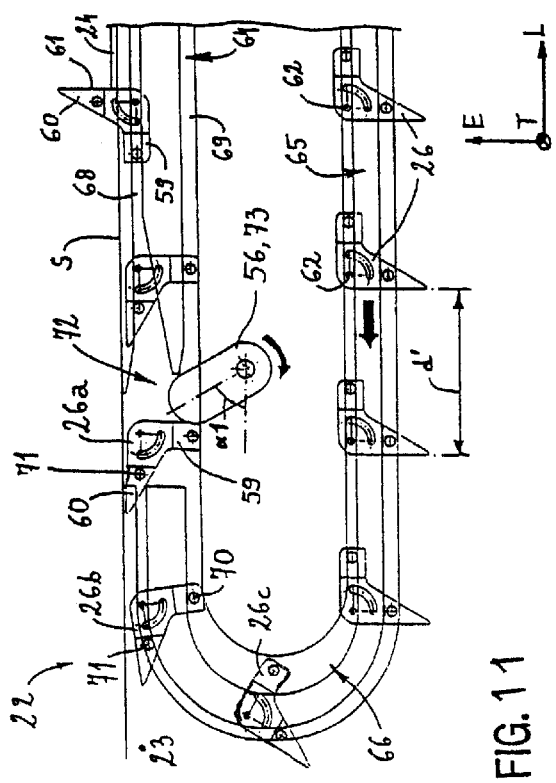

When the first pusher 26a emerges in the switching zone 72, its second branch 60 abuts against the cam 73, the latter being in its first angular position α1. The cam 73 then forces the pusher 26a to pivot about its shaft (FIG. 11).

Figure 12:
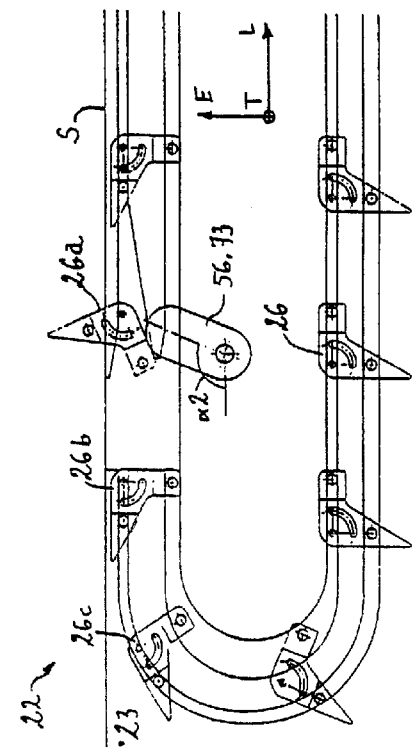
Figure 15:
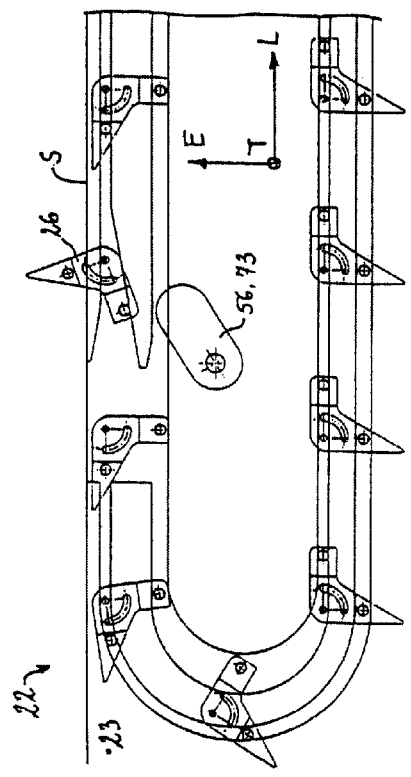
Figure 17:
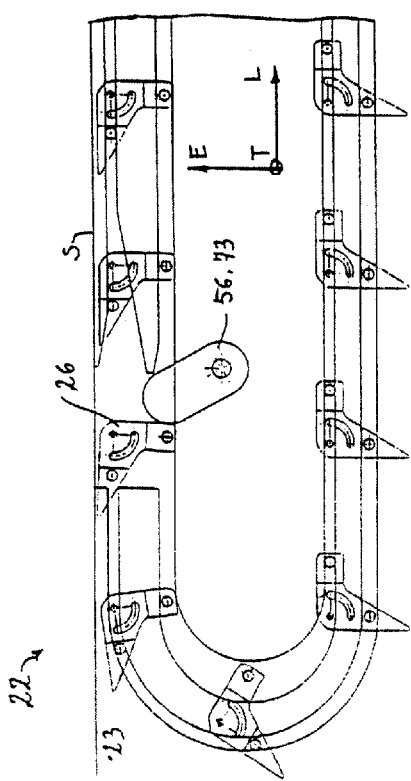
Figure 16:
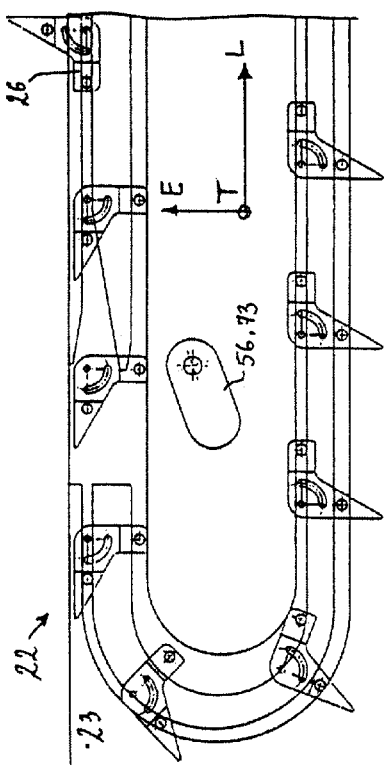
Figure 18:
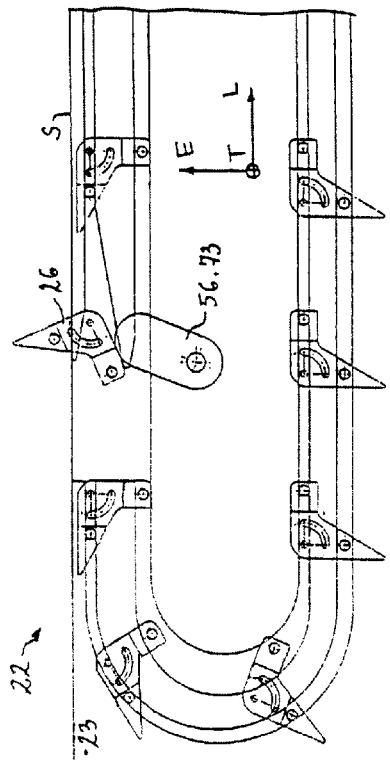

Under the action of the cam 73, which accompanies the first pusher 26a at constant speed, the first toe 70 is switched towards the top track 68, the second branch 60 projecting from the transportation surface upwards, in order to come into engagement with a blank 24 (FIG. 12). The first pusher is then in its active position.

When the cam 73, in the second angular position α2, disengages the first pusher 26a, the latter is kept fixed with respect to rotation, its second toe 71 being guided by the top track 68 of the rail along the transportation surface S.

Figure 13:
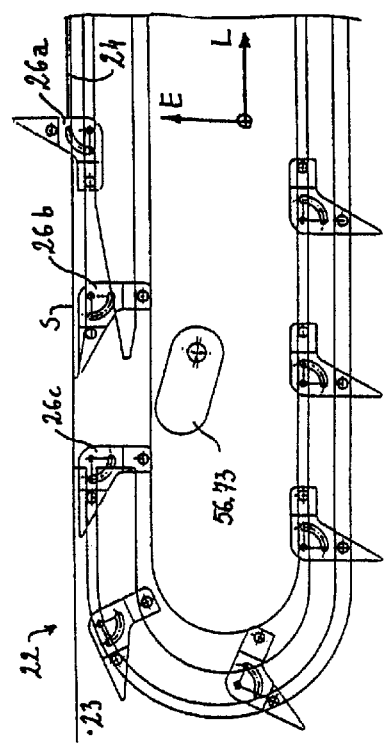

The cam 73 then accelerates, pivoting about its shaft. During this time, the second pusher 26b travels through the switching zone 72, remaining in its inactive position (FIG. 13).

Figure 14:
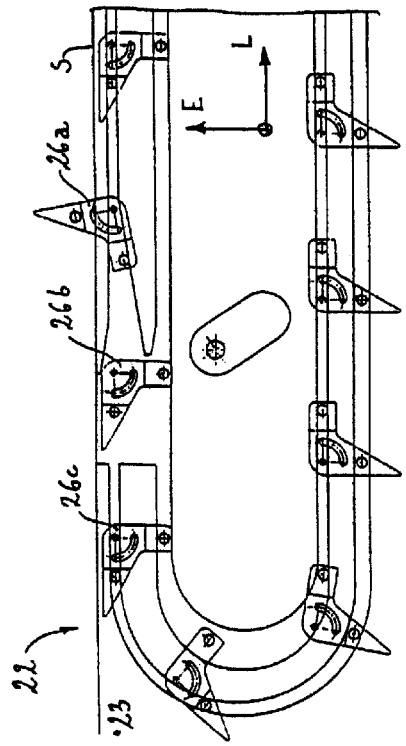

Then the cam 73 decelerates in order to regain its first angular position α2, and engages the second pusher 26c in the same way as the first pusher 26a (FIG. 14).

Each pusher 26 pushes a blank 24 up to the conveyer 11. After the blank has been taken over by the conveyer 11, the pusher 26 returns to its inactive position in the second end zone 67 of the transporter 23, for example by pivoting by gravity about its shaft.

To this end, the rail 63 comprises an auxiliary track 74 emerging in the transportation surface 5, connecting the latter to the second end zone 67.

Close to this end zone 67, the auxiliary track 74, the top track 68 and the bottom track 69 are locally inclined downwards in order to force the active pushers 26 to move away from the transportation surface S and release the blanks 24.

According to a second setting in which the maximum speed of rotation of the cam 73 is decreased, the latter can engage one pusher 26 out of three. This operating mode, identical to that which has just been described, is illustrated in FIGS. 15 to 18.

Naturally the throughput of the installation 1 can be adjusted by simultaneously and progressively increasing the rotation speeds of all the drive means.

This is made possible by the use of motors with a rotation speed which is adjustable or variable continuously, combined with the use of a control and slaving device able to synchronise the drive means and to apply to them speed profiles already programmed in memory.

What is claimed is:

1. A packaging installation for forming finished products, such as packs, from batches (7) of articles (2), which comprises:
    a conveyer (11) able to receive the successive batches (7) of articles (2) in order to route them from a so-called upstream location to a so-called downstream location, the upstream faces of two successive batches (7) being spaced apart by a predetermined distance known as the pitch (P);
    a feed track (9) along which the articles (2) are routed one by one to the said conveyer (11) whilst being juxtaposed with each other;
    means (14) of transferring the articles (2) from the feed track (9) to the conveyer (11), able to take and group the articles (2) in order to form batches (7) spaced apart; and
    a transporter (23) able on the one hand to route cardboard blanks (24) or equivalent one by one, placed substantially flat on the transporter (23), to the said conveyer (11), and to dispose the blanks (24) on the conveyer (11) opposite batches (7) of articles;
    means (13) of driving the conveyer, the transfer means (15) and the transporter (25),
    characterised in that it comprises a control and slaving device (16) for the drive means (13, 15, 25), able to apply to each drive means (13, 15, 25) a speed profile chosen from amongst a preprogrammed set of speed profiles, to allow the adjustment of the pitch (P) and/or of the number of articles (2) per batch (7) according to the pitch and/or the type of batch required.

2. An installation according to claim 1, characterised in that the said transporter (23) comprises pushers (26) for the blanks (24) arranged successively on the transporter (23), each pusher (26) being able to come into engagement with a blank (24) in order to route it to the conveyer (11), the distance between two successive pushers (26) in engagement with a blank (24) being predetermined and substantially equal to the pitch (P).

3. An installation according to claim 2, characterised in that it also comprises means (57) of adjusting the distance between two successive pushers (26) in engagement with a blank (24) according to a predetermined value chosen from amongst a group of preprogrammed values, all multiples of the same value of the said modulus (m).

4. An installation according to claim 2, characterised in that each pusher (26) is mounted so as to be able to move between a so-called inactive position in which the pusher (26) is located at a distance from the transportation surface (S) and does not project therefrom, and a so-called active position in which it projects at least partially from the transportation surface (S) in order to come into engagement with an object and push it along the said surface (S), so that the number of pushers (26) simultaneously in the active position can be varied.

5. An installation according to claim 2, characterised in that it comprises:
    a means (25) of driving a movable support (55) for the pushers;
    a movable member (56) for actuating the pushers (26) in order to cause them to pass from their inactive position to their active position at the transportation surface;
    a means (57) of driving the said actuating member (56).

6. An installation according to claim 5, characterised in that the control device (16) is arranged to apply to the drive means (25) of the actuating member (56) a speed profile such that the functioning of the actuating member (56) is periodic, the period of the actuating member (56) being defined as the interval of time separating two successive passages of the actuating member (56) through the same position.

7. An installation according to claim 2, characterised in that, the period of the transporter (23) being defined as the interval of time separating the passage of two pushers (26) through the same point on the path, the control device (16) is arranged so that the period of the actuating member (56) is a multiple of the period of the transporter (23).

8. An installation according to claim 2, characterised in that each pusher (26) is in the form of a rigid piece which comprises a first branch (59) able to come into engagement with the drive member (56), and a second branch (60) substantially perpendicular to the first, able to project at least partly from the transportation surface (S) in order to come into engagement with a blank (24).

9. An installation according to claim 2, characterised in that each pusher (26) comprises a shaft (62) substantially perpendicular to the conveying plane (P), forming a means of fixing the pusher (26) to the support (55), and about which the pusher (26) is able to pivot, in order to pass from its inactive position to its active position, or vice-versa.

10. An installation according to claim 2, characterised in that the transporter (2) comprises a guide rail (63) which lies substantially in the conveying plane (P), substantially along the path defined by the support (55), the said rail (63) comprising, substantially along the transportation surface (S), a first so- called top track (68) for guiding the pushers (26), contiguous with the transportation surface (S), and a second so-called bottom track (69) for guiding the pushers (26), parallel to the first.

11. An installation according to claim 10, characterised in that each pusher (26) comprises at least one first toe (70), projecting from the first branch (59) substantially perpendicularly to the conveying plane (P), able to cooperate with the bottom track (69) when the pusher (26) is in the inactive position, and with the top track (68) when the pusher (26) is in the active position.

12. An installation according to claim 11, characterised in that each pusher (26) also comprises at least one second toe (71), projecting from the second branch (60) perpendicularly to the conveying plane (P), able to cooperate with the top track (68) when the pusher (26) is in the inactive position.

13. An installation according to claim 10, characterised in that the transporter (2) has a so-called switching zone (72) where the guide rail (63) is interrupted, and in which the pushers (26) are able to pivot about their shaft (62) in order to pass from their inactive position to their active position.

14. An installation according to claim 13, characterised in that the actuating member (56) comprises a cam (73) lying substantially in the conveying plane (P) close to the said switching zone (72), and driven in rotation in this plane about a shaft substantially perpendicular to it by the said drive means (25), passing through a first angular position ($\alpha 1$) in which the said cam (73) engages at least one of the pushers (26) in order to cause it to pivot about its shaft from its inactive position to its active position when passing through the switching zone (72), and a second angular position ($\alpha 2$) in which the said cam (73) releases the pusher (6).

15. An installation according to claim 5, characterised in that the speed profile is chosen from amongst a preprogrammed set of speed profiles such that the actuating member (56) selectively engages a certain number of successive pushers (26) belonging to a predetermined subset of the set of pushers (26).

16. An installation according to claim 1, characterised in that the transfer means (14) comprise a rotating member able to take and group the articles (2) in order to form spaced-apart batches (7), the said rotary member comprising a succession of gripping members (113) arranged so as to engage the articles (2) at a supply station (109) and to release them at a discharge station (111), continuously driven along a closed path, at a so-called transfer speed (VT), greater than or equal to the input speed (VE), the transfer means (14) being arranged so that the transfer speed (VT) of the gripping members (113) is non-constant, so that:

when the articles (2) are engaged, the speed (VT) of the gripping members (113) is substantially equal to the input speed (VE);

when the articles (2) are transferred, the speed (VT) of the gripping members (113) is greater than the input speed (VE);

when the articles (2) are disengaged, the speed (VT) of the gripping members (113) is substantially equal to the output speed (VS).

17. An installation according to claim 16, characterised in that the articles (2) are driven continuously along the said closed path on a route which follows at least a quarter of the periphery of the rotating member, so that the gripping members (113) can come into contact with the articles and group them in successive batches, the speed of the rotating member being greater than the input speed (VE) of the articles and the rotating member making it possible to vary the number of articles per batch.

18. An installation according to claim 17, characterised in that the rotating member of the transfer means (14) comprises a toothed wheel (114), at least part of which (118) is mounted so as to pivot about a rotating shaft (R), this wheel (114) being disposed close to the supply track (9) and the discharge track (11), this wheel (114) comprising the said gripping members (113).

19. An installation according to claim 16, characterised in that the said gripping members (113) are in the form of teeth (113) substantially regularly spaced apart, projecting radially from the toothed wheel (114), each tooth (113) describing a circle passing through a first angular position ($\Theta E$) in which it engages at least one article (2) at the supply station (109), and a second angular position ($\Theta s$) in which it disengages it at the discharge station (111).

20. An installation according to claim 19, characterised in that the angular distance between the first and second angular positions ($\theta E$, $\theta S$) is between 90 and 180°.

21. An installation according to claim 18, characterised in that the said toothed wheel (114) comprises a circular fixed base (117) and a rotating disc (118), coaxial and placed one above the other, between which radial branches (120) are disposed, whose free ends (123) form the said teeth (113).

22. An installation according to claim 21, characterised in that the said branches (120) are mounted for rotation on the rotating disc (118) by means of pivots (122) with axes (R1) parallel to the axis (R) of the toothed wheel (114).

23. An installation according to claim 22, characterised in that each branch (120) has a roller (124) or a toe which cooperates with a groove (125) provided in the base (117), this groove (125) being extended in a closed loop around the rotation axis (R) of the toothed wheel (114).

24. An installation according to claim 23, characterised in that the said groove (125) is arranged so that:

when the tooth (113) passes through the supply station (109), the arm (120) which carries it pivots in the direction opposite to the rotation of the wheel (114) so that the speed (VT) of the wheel (113) decreases until it is substantially equal to the input speed (VE) when the articles (2) are engaged;

between the supply station (109) and the discharge station (111), the orientation of the said arm (120) is constant with respect to the wheel (114) so that the speed (VT) of the tooth (113) increases until it is substantially equal to the speed of the wheel (114), so that the articles (2) are grouped together in batches (4), accelerated and spaced apart.

25. An installation according to claim 16, characterised in that it also comprises means (18) disposed close to the supply station, able to sequence and time the articles (2)

coming from the supply track (9), so that they have the required positioning and separation at the time they are gripped by the transfer means (14).

26. An installation according to claim 25, characterised in that the means (18) for sequencing and timing the articles are in the form of a star wheel (137), mounted so as to pivot about a rotation axis (R'), comprising at its periphery teeth (138) able to engage and disengage the articles (2), the teeth (138) having housings (139) able to receive the articles (2) individually, the tangential speed of the said star wheel (137) being substantially equal to the input speed (VE).

27. An installation according to claim 16, characterised in that it comprises a means (19) of driving the said star wheel connected to the control device (16).

* * * * *